United States Patent Office 3,441,584
Patented Apr. 29, 1969

3,441,584
PROCESS FOR THE SEPARATION OF
ORGANOTRICHLOROSILANES
Andre Rene Marcel Bazouin, Lyon, and Marcel Joseph
Celestin Lefort, Caluire, France, assignors to Rhone-
Poulenc S.A., Paris, France, a French body corporate
No Drawing. Filed Dec. 1, 1966, Ser. No. 598,177
Claims priority, application France, Dec. 9, 1965,
41,617
Int. Cl. C07f 7/20
U.S. Cl. 260—448.2                    13 Claims This invention provides a chemical process for separating organotrichlorosilanes from mixtures containing the same, especially in admixture with other organochlorosilanes. The new process is especially useful in separating organotrichlorosilanes of formula RSiCl₃ from diorganodichlorosilanes of formula R(CH₃)SiCl₂, R being the same organic radical in both cases.

The manufacture of diorganopolysiloxane oils requires the use of diorganodichlorosilanes having a high degree of purity. Organotrichlorosilanes on the other hand are important starting materials in the organosilicon resins industry. Since the various processes for the synthesis of organochlorosilanes yield mixtures of silicon derivatives, the resulting mixtures must subsequently be separated into the constituents which are used in each of these applications. This separation is generally carried out by fractional distillation using very high efficiency columns. It is very costly in energy, and is obviously all the more difficult to apply when mixtures of organochlorosilanes of low volatility and having very similar boiling points are to be separated.

It has been proposed to carry out this separation by chemical means. Thus, according to French patent specification No. 1,215,336, diorganodichlorosilanes containing organotrichlorosilanes may be purified by a selective hydrolysis which affects the organotrichlorosilanes only, for example by working in solution in certain organic ethers such as tetrahydrofuran or dioxane. A similar process based on the use of moist air is described in Russian patent specification No. 163,613. However, these methods do not allow the organotrichlorosilanes introduced to be recovered.

It is also known, from French patent specification No. 1,141,735, that foramide and dimethylformamide react with organotrichlorosilanes to form solid stable complexes from which other organochlorosilanes can be separated by distillation. This method has the advantage of not permitting working with mixtures having a high concentration of organotrichlorosilanes because the complexes formed are stable at ordinary temperature, and recovery of the dimethylformamide and of the trichlorinated silanes is not feasible even by heating the complex to the boiling point of dimethylformamide. Since, therefore, the complexing reagent and the organotrichlorosilanes cannot be recovered, this method is not industrially practicable.

It has also been suggested in French patent specification No. 1,050,757 to treat the mixture of organochlorosilanes with a diorganodiacyloxysilane. Since the latter reagent is costly, this method is not satisfactory unless the organotrichlorosilane content of the mixtures to be purified is low. In the case of mixtures of high organotrichlorosilane content, it is, for practical purposes, necessary to remove the major part of the latter by a preliminary distillation.

The present invention provides a process for the separation of an organotrichlorosilane from a liquid mixture containing the same which comprises contacting said mixture with tris(dimethylamino)phosphine oxide and separating the solid complex formed. Generally speaking the organotrichlorosilane is in admixture with other organochlorosilanes.

The invention is based on the discovery that tris(dimethylamino)phosphine oxide yields solid complexes with organotrichlorosilanes. These complexes (which, as new compounds, constitute one aspect of the invention) are moreover easily separated and decomposed to regenerate the organotrichlorosilanes and the tris(dimethylamino) phosphine oxide.

The organotrichlorosilanes which can be separated in accordance with the present invention include more especially the compounds of the general formula RSiCl₃, in which R is an alkyl radical of 1 to 4 carbon atoms, an alkenyl radical with a single double bond of 2 to 4 carbon atoms, especially vinyl or allyl, a cycloaliphatic radical having 5 or 6 ring carbon atoms, such as cyclopentyl, cyclohexyl, cyclohexenyl, methylcyclopentyl or methylcyclohexyl, a mononuclear aryl radical, such as phenyl and alkyl phenyl in which the alkyl radical contains up to 4 carbon atoms, a mononuclear aralkyl radical, such as benzyl, or a hydrocarbon radical as aforesaid in which one or more hydrogen atoms have been replaced by atoms or groups which do not interfere with the formation of the complex and which are insert to tris(dimethylamino)phosphine oxide. An example of such a substituent is halogen.

The new process is especially useful in connection with organochlorosilane mixtures formed by a monoorganotrichlorosilane and a diorganodichlorosilane of formulae RSiCl₃ and R(CH₃)SiCl₂ respectively, in which R is the same, because the constituents of such mixtures have boiling points which are very often so close that even very extensive rectification does not separate them completely. Thus, the new process of the invention is particularly advantageous in the case of mixtures of methylphenyldichlorosilane and phenyltrichlorosilane, whose constituents boil at similar high temperatures.

Analysis, and particularly examination by nuclear magnetic resonance, shows that the complexes formed by tris(dimethylamino)phosphine oxide with organotrichlorosilanes have the formula:

$$RSiCl_3.2O=P[-N(CH_3)_2]_3 \qquad (I)$$

Thus, to form the complex, two mols of tris(dimethylamino)phosphine oxide are theoretically necessary per mol of organotrichlorosilane. In practice, an excess of aminophosphine oxide is used. This excess is not critical but there is in general no advantage in using more than 3 mols of aminophosphine oxide per mole of organotrichlorosilane. The reaction must be carried out at a temperature range at which the complex is stable, which for practical purposes means a temperature below ambient temperature, generally between −30° and +20° C.

The process may be carried out with or without diluent, the presence of a diluent facilitating any filtration which is carried out. Suitable diluents are organic liquids which are inert under the working conditions. These diluents are so chosen that they should dissolve the minimum amount of complex under the experimental conditions. Generally, any diluent which ensures good separation of the complex from the reaction mixture is suitable. Examples of such diluents are linear aliphatic hydrocarbons, such as hexane, heptane, or octane, branched aliphatic hydrocarbons, such isooctane, or mixtures of linear and branched hydrocarbons such as petroleum ether. Cyclic hydrocarbons, such as cyclopentane and cyclohexane, or alkyl-cyclic hydrocarbons, such as methylcyclohexane, are equally suitable.

The separation of the organochlorosilanes of the new process can, in general, be carried out as follows. Tris(dimethylamino)phosphine oxide is added to the mixture of organochlorosilanes, optionally diluted with a diluent of the kind mentioned above, in a proportion determined in the manner explained above, and the mixture is kept at a temperature between −30° and +20° C. for such time as is necessary for the complex or complexes to form, an average period being 1 to 3 hours. The crystalline precipitate formed is then filtered off. The solid complex is then decomposed and the organotrichlorosilane(s) and tris(dimethylamino)phosphine oxide so formed are separated by fractional distillation. The filtrate is also fractionated, at atmospheric or reduced pressure, to recover the uncomplexed organochlorosilane(s).

When the proportion of organothirchlorosilane in the mixture is low, it is generally not necessary to use a diluent; but use of a diluent is advantageous in the case of mixtures rich in organotrichlorosilanes.

With such mixtures, consisting of an organodichlorosilane and a high proportion of an organotrichlorosilane, the process is preferably carried out in 2 stages. In the first stage, a separation is carried out on a mixture which has previously been diluted by addition of a suitable diluent, giving on the one hand a solid complex which is separated and decomposed into organotrichlorosilane and tris(dimethylamino)phosphine oxide, and on the other hand a filtrate which is distilled to isolate an organodichlorosilane which still contains a proportion of organotrichlorosilane. In the second stage, this still impure organodichlorosilane is again treated with tris(dimethylamino)phosphine oxide but without using a diluent.

The method of operation which has been described can be varied. For example, in the case of volatile organochlorosilanes, the uncomplexed organochlorosilane(s) may be recovered directly from the unfiltered reaction mixture by simple distillation, in vacuo when appropriate. In this case it is of course necessary for the boiling point of the free organochlorosilanes at the working pressure to be lower than the lowest decomposition temperature of any complex formed.

The following examples illustrate the invention.

EXAMPLE 1

The apparatus used for the reaction consists of a cylindrical reaction vessel of borosilicate glass having a double outer jacket, the vessel having a one litre capacity and being connected at its lower part to a filtration system. The reaction vessel is provided with a dropping funnel, a reflux condenser, a rotating stainless steel blade stirrer, a thermometer sleeve, and an inlet for anhydrous nitrogen. The filtration system comprises a Buchner funnel provided with a sintered glass disc (diameter: 80 mm., porosity: 30μ), and a double outer jacket, and a filter flask. This apparatus is a sealed assembly and a strictly anhydrous atmosphere of nitrogen is maintained therein. A pump circulates a refrigerant mixture in the double jacket of the reactor and of the Buchner funnel.

A mixture consisting of 95.5 g. (0.5 mol) of methylphenyldichlorosilane and 106 g. (0.5 mol) of phenyltrichlorosilane is introduced with stirring into the reaction vessel. 268 g. (1.5 mol) of anhydrous tris(dimethylamino)phosphine oxide and 100 cm.³ of anhydrous cyclohexane are added. The reactor is cooled to −10° C. by circulating an acetone/solid carbon dioxide refrigerant mixture through the double jacket for 5 minutes. Stirring is then continued for one hour, during which the mixture is allowed to revert to ambient temperature. The reaction mixture, which is in the form of a thick mass, is directly run through the lower opening of the reactor into the Buchner funnel and is then filtered. After filtration, 219 g. of a white crystalline precipitate consisting of the complex of formula:

$$C_6H_5SiCl_3 \cdot 2O=P[-N(CH_3)_2]_3$$

and 318 g. of filtrate are obtained.

These two fractions are separately distilled in an apparatus consisting of a 1 litre flask, a borosilicate glass column (height 60 cm., diameter 4 cm.) containing, as packing, pieces of knitted metal ribbon (trade mark "Multiknit"), an analyser, a descending condenser, and a collecting system.

On distilling the precipitate the fractions listed in the following Table I are obtained:

TABLE I

| Boiling point | Weight of fraction, g. | Nature of fraction |
|---|---|---|
| 89.5° C./17 mm. Hg | 71 | Phenyltrichlorosilane (96.5%).* Methylphenyldichlorosilane (3.5%). |
| 121–122° C./17 mm. Hg | 135 | Tris(dimethylamino)phosphine oxide. |

* The mixture of chlorosilanes is analysed by gas phase chromatography.

On distilling the filtrate, the fractions listed in the following Table II are obtained:

TABLE II

| Boiling point | Weight of fraction, g. | Nature of fraction |
|---|---|---|
| 79–80° C./15 mm. Hg | 73 | Cyclohexane. |
| 84–85° C./15 mm. Hg | 103 | Methylphenyldichlorosilane (90%). Phenylthrichlorosilane (10%). |
| 115–116° C./15 mm. Hg | 120 | Tris(dimethylamino)phosphine oxide. |

The fraction boiling at 84–85° C., which contains 90% of methylphenyldichlorosilane and 10% of phenyltrichlorosilane is then treated in the following manner. It is introduced, with stirring, into the reaction vessel previously described, which has previously been purged with nitrogen, and 29 g. of tris(dimethylamino)phosphine oxide are added to it. Stirring is continued for 1 hour 30 minutes, while the reaction medium is continuously cooled to between −25° and −30° C. The mixture is then run into the Buchner funnel, which is cooled to between −25° and −30° C., and filtered. 94.6 g. of filtrate and 36 g. of precipitate are isolated in this way. On distilling the filtrate, the fractions shown in the following Table III, are collected:

TABLE III

| Boiling point | Weight of fraction, g. | Nature of fraction |
|---|---|---|
| 87–88° C./16 mm. Hg | 84 | Methylphenyldichlorosilane (98.4%). Phenyltrichlorosilane (0.3%). Impurities (1.3%). |
| 114–115° C./16 mm. Hg | 8.6 | Tris(dimethylamino)phosphine oxide. |

On distilling the precipitate, the fractions shown in the following Table IV are obtained:

TABLE IV

| Boiling point | Weight of fraction, g. | Nature of fraction |
|---|---|---|
| 84° C./16 mm. Hg | 15.5 | Phenyltrichlorosilane (49.1%). Methylphenyldichlorosilane (50.1%). Impurities (0.8%). |
| 113–114.5° C./16 mm. Hg | 15.9 | Tris(dimethylamino)phosphine oxide. |

EXAMPLE 2

Proceeding as in Example 1, but starting with a mixture of dimethyldichlorosilane and methyltrichlorosilane, an equally satisfactory separation of the constituents is achieved. The white crystalline complex obtained has the formula:

$$CH_3SiCl_3 \cdot 2O=P[-N(CH_3)_2]_3$$

EXAMPLE 3

Methylethyldichlorosilane can readily be separated from its mixtures with ethyltrichlorosilane using the method of Example 1. The solid complex produced is a white crystalline product of formula:

$$C_2H_5SiCl_3 \cdot 2O=P[-N(CH_3)_2]_3$$

EXAMPLE 4

Methylvinyldichlorosilane and vinyltrichlorosilane are separated by the process described in Example 1. The white crystalline complex obtained has the formula:

$$CH_2=CH-SiCl_3 \cdot 2O=P[-N(CH_3)_2]_3$$

We claim:
1. Process for the separation of an organotrichlorosilane from a liquid mixture containing the same which comprises contacting said mixture with tris(dimethylamino)phosphine oxide and separating the solid complex formed.
2. Process according to claim 1, in which the separated solid complex is distilled to liberate the organotrichlorosilane and tris(dimethylamino)phosphine oxide.
3. Process according to claim 1, in which the said mixture comprises other organochlorosilanes in addition to the said organotrichlorosilane.
4. Process according to claim 1, in which the organotrichlorosilane is of the formula:

$$RSiCl_3$$

where R is alkyl of 1 to 4 carbon atoms, alkenyl of 2 to 4 carbon atoms, or phenyl.
5. Process according to claim 4, in which the said organotrichlorosilane is in admixture with an organomethyldichlorosilane of the formula:

$$R(CH_3)SiCl_2$$

where R is as defined in claim 4.
6. Process according to claim 3, in which phenyltrichlorosilane is separated from methylphenyldichlorosilane.
7. Process according to claim 3, in which methyltrichlorosilane is separated from dimethyldichlorosilane.
8. Process according to claim 3, in which ethyltrichlorosilane is separated from methylethyldichlorosilane.
9. Process according to claim 3, in which vinyltrichlorosilane is separated from methylvinyldichlorosilane.
10. Process according to claim 1, in which at least two molecular proportions of the said phosphine oxide are used relative to the organotrichlorosilane, and the reaction is carried out at $-30°$ to $+20°$ C.
11. A complex of the formula:

$$C_2H_5SiCl_3 \cdot 2O=P[-N(CH_3)_2]_3$$

in which R is an alkyl radical of 1 to 4 carbon atoms, an alkenyl radical of 2 to 4 carbon atoms, a cycloaliphatic radical having 5 or 6 ring carbon atoms, a mononuclear aryl radical, a mononuclear aralkyl radical, or such a radical in which one or more hydrogen atoms have been replaced by atoms or groups compatible with the complex and inert to tris(dimethylamino)phosphine oxide.
12. A complex according to claim 11, in which R is alkyl of 1 to 4 carbon atoms, alkenyl of 2 to 4 carbon atoms, cyclopentyl, cyclohexyl, cyclohexenyl, methylcyclopentyl, methylcyclohexyl, phenyl, alkyl-phenyl in which the alkyl radical contains up to 4 carbon atoms, or benzyl.
13. A complex according to claim 11, having one of the formulae:

$$C_6H_5SiCl_3 \cdot 2O=P[-N(CH_3)_2]_3$$
$$CH_3SiCl_3 \cdot 2O=P[-N(CH_3)_2]_3$$
$$C_2H_5SiCl_3 \cdot 2O=P[-N(CH_3)_2]_3$$

or $$CH_2=CH-SiCl_3 \cdot 2O=P[-N(CH_3)_2]_3$$

References Cited

UNITED STATES PATENTS 3,186,967  6/1965  Nitzsche et al. __ 260—448.2 XR

TOBIAS E. LEVOW, *Primary Examiner.*

J. P. PODGORSKI, *Assistant Examiner.*